Sept. 8, 1953 P. A. WHISLER 2,651,162
FORAGE HARVESTER
Filed April 19, 1949 10 Sheets-Sheet 1

Inventor
Paul A. Whisler
by Kenneth McKnett
Attorney

Sept. 8, 1953  P. A. WHISLER  2,651,162
FORAGE HARVESTER

Filed April 19, 1949  10 Sheets-Sheet 2

Sept. 8, 1953 P. A. WHISLER 2,651,162
FORAGE HARVESTER
Filed April 19, 1949 10 Sheets-Sheet 3

Inventor
Paul A. Whisler
by Kenneth MacKenzie
Attorney

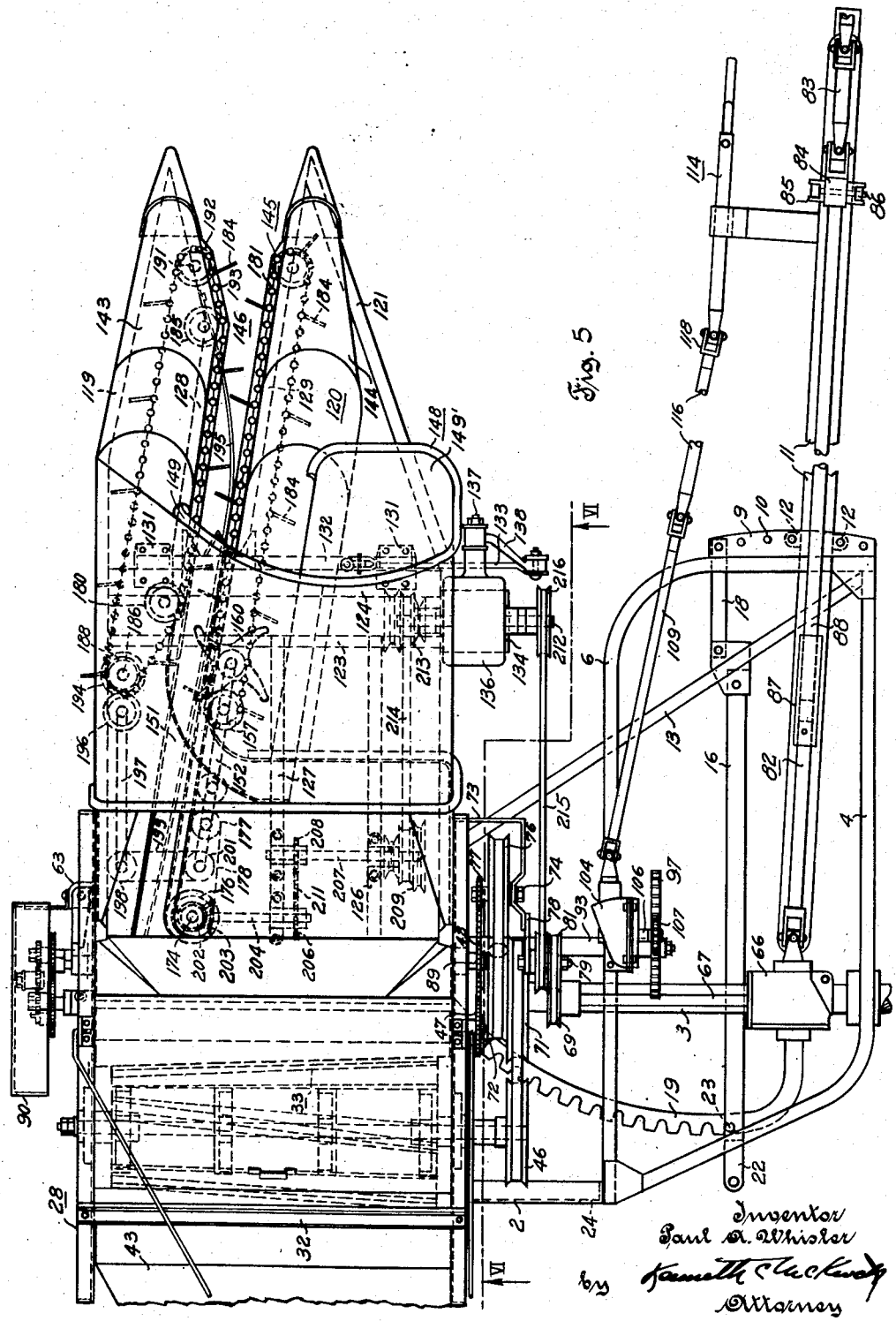

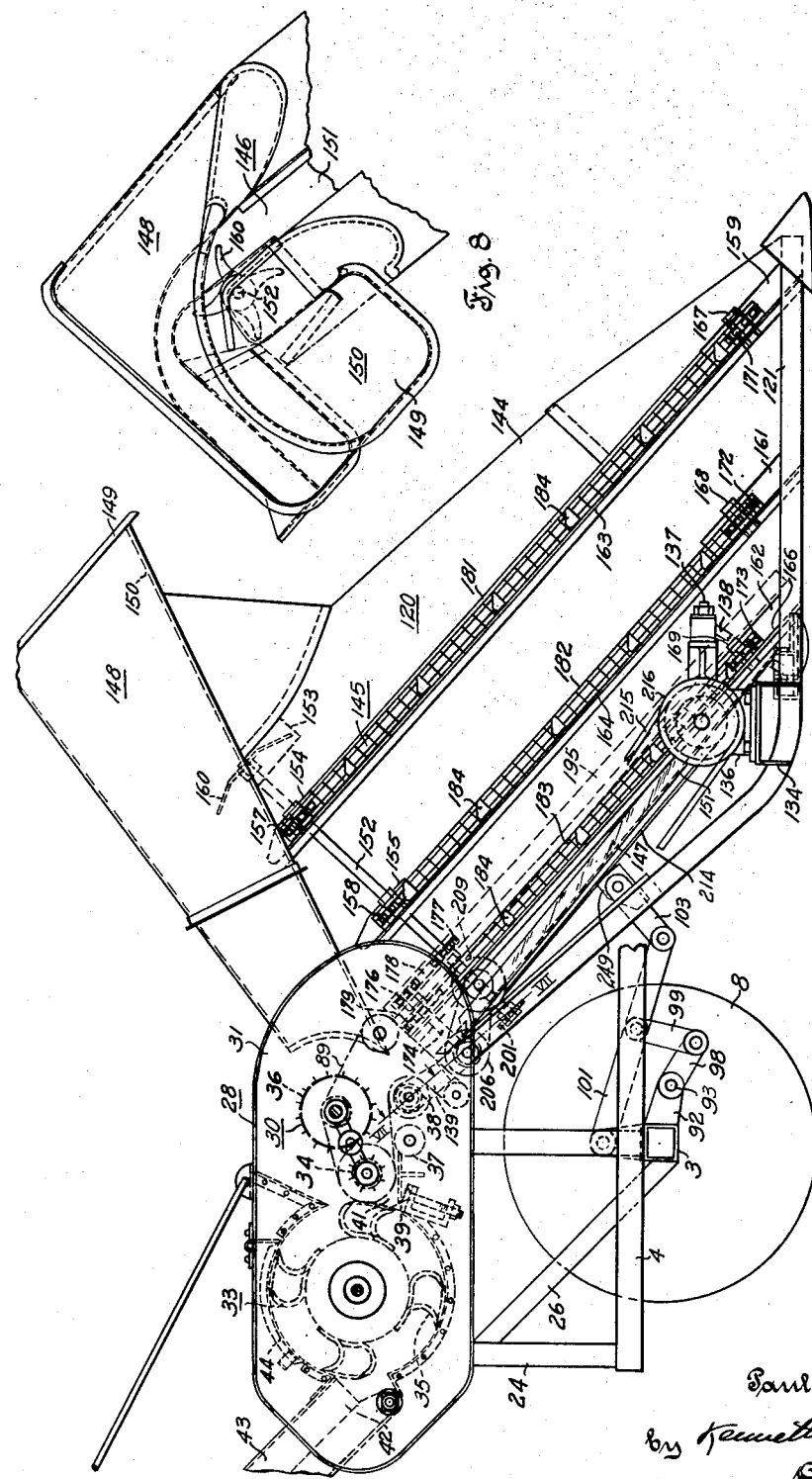

Sept. 8, 1953

P. A. WHISLER 2,651,162

FORAGE HARVESTER

Filed April 19, 1949

Inventor
Paul A. Whisler
by Kenneth P. McKie
Attorney

Sept. 8, 1953  P. A. WHISLER  2,651,162
FORAGE HARVESTER
Filed April 19, 1949  10 Sheets-Sheet 8

Inventor
Paul A. Whisler
by Kenneth C. Luckurt
Attorney

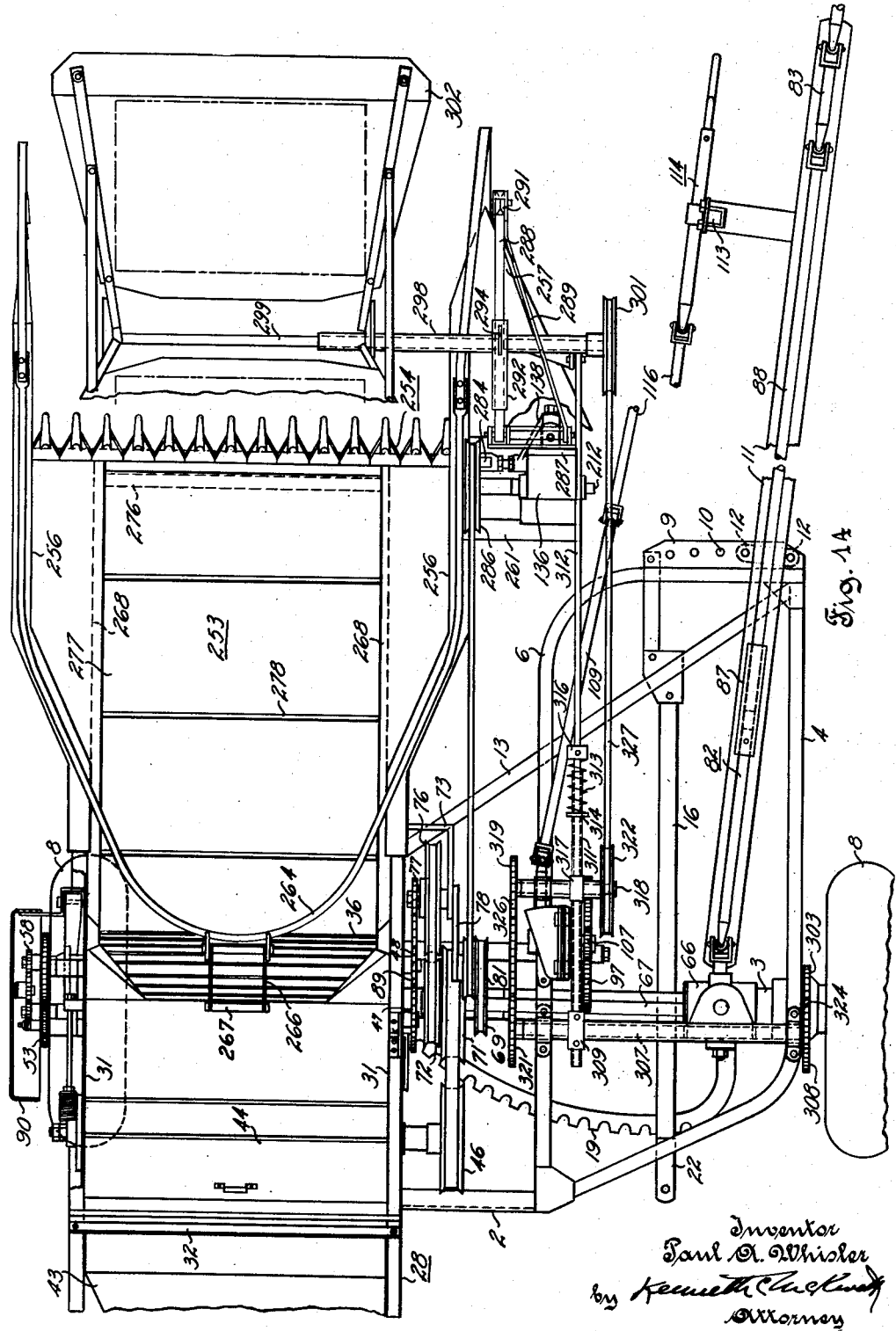

Sept. 8, 1953     P. A. WHISLER     2,651,162
FORAGE HARVESTER
Filed April 19, 1949     10 Sheets—Sheet 10
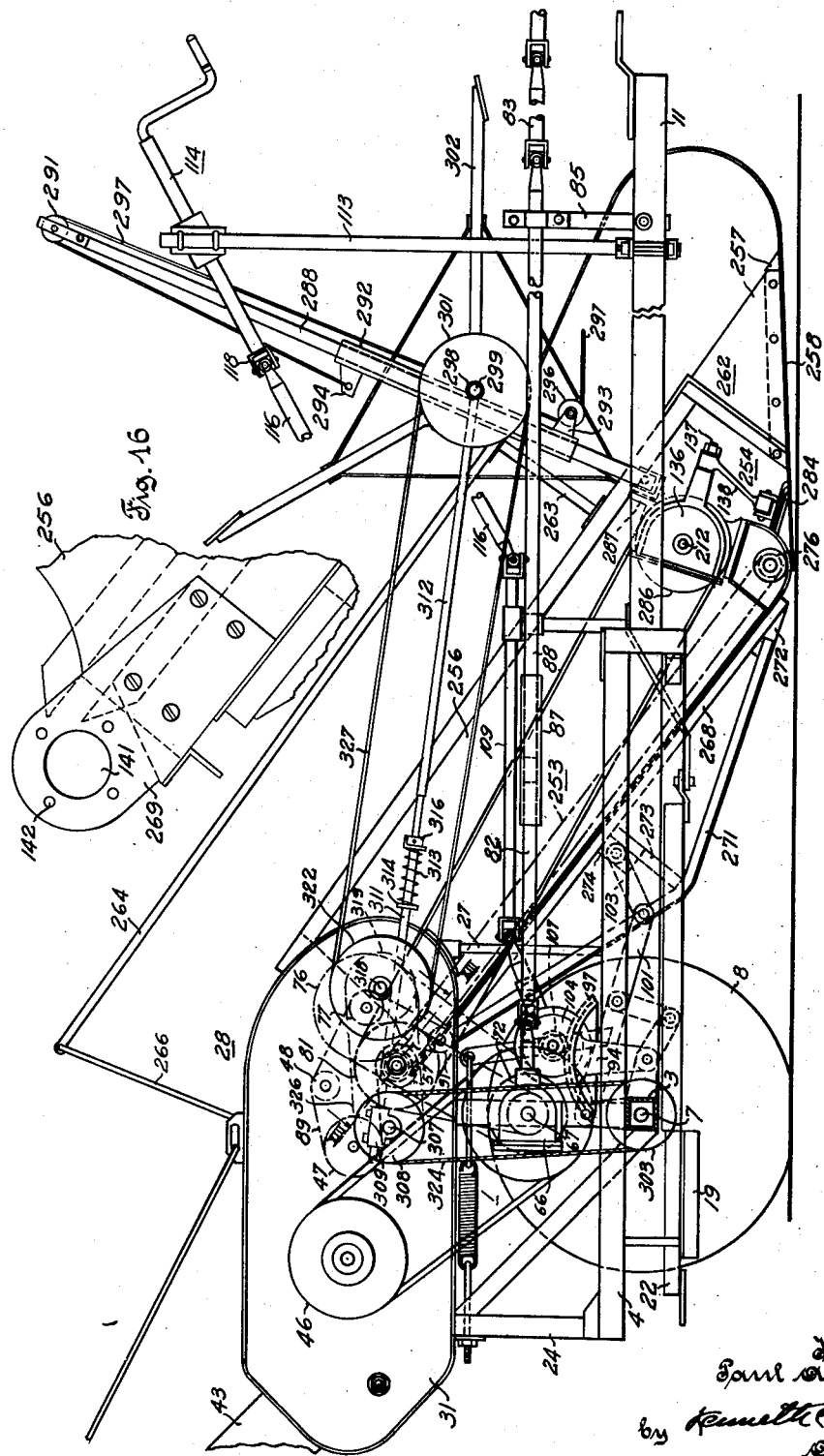

Patented Sept. 8, 1953

2,651,162

UNITED STATES PATENT OFFICE 2,651,162

FORAGE HARVESTER

Paul A. Whisler, La Porte, Ind., assignor to Allis-Chalmers Manufacturing Company, Milwaukee, Wis., a corporation of Delaware Application April 19, 1949, Serial No. 88,380

4 Claims. (Cl. 56—60)

This invention relates generally to forage harvesters and is more particularly concerned with and directed toward a design of machine particularly effective and efficient in harvesting grasses and legumes or row crops, as desired.

The capacity of a forage harvester, measured in tons per hour, is largely dependent on four factors: (1) power availability; (2) crop and field conditions; (3) length of cut, i. e. length of the chopped pieces; and (4) proper machine adjustment, particularly of knives and shear bar. Length of cut and proper machine adjustment are factors which are generally common to and similarly affect the operation of all types of machines, whereas power availability is primarily a matter of initial selection since a harvester to be purchased may be of the type operated by excess power developed by the propelling tractor or of the type operated by a separate power unit mounted on the harvester. More power is usually available in the type of machine incorporating a separate power unit and therefore while the proper adjustment of such a machine is less critical in order to obtain fairly satisfactory results, proper adjustment is essential to obtaining efficient operation with both types of machines. And although variations in crop and field conditions may be considered as similarly affecting both types of machines, a machine incorporating a separate power unit is less sensitive to such variations since its operation is not in any manner affected by the power requirements of the propelling tractor. However, a machine of the last mentioned type entails a considerable increase in initial cost and an inefficient utilization of available power, the later being attributable to the fact that there is only a partial utilization of available power during most harvesting operations and to the further fact that the separate power unit necessarily remains idle during a large portion of each year.

A forage harvester designed to be operated by power derived from the propelling tractor should minimize power requirements for satisfactory operation under all crop and field conditions normally experienced to thereby render the harvester practical for use with the greatest possible number of the different sizes and makes of available tractors. And in this connection, it has been found that power requirements can be materially reduced by employing knives shaped to function both as chopping and conveying elements (see U. S. Patent, C. E. Frudden, No. 2,450,277, granted September 28, 1948, Forage Cutting Apparatus Including a Rotor Having Pocketed Blades), and by employing chopping knives having an effective cutting length more nearly equal to the actual length of the swath cut in harvesting grasses and legumes than it is to the length of a cutter bar suitable for use in harvesting row crops, such as corn. In the known designs of ensilage harvesters, the length of the chopping knives heretofore employed have been made to conform with row crop requirements and in adapting such machines to harvest grasses and legumes, it is common practice to employ a fairly wide cutter bar and to laterally converge and convey the cut grasses and legumes to and through a narrow throat section immediately preceding the feeding devices and chopping knives. And as a result, the speed of these feeding devices and chopping knives must be relatively high in order to prevent a plugging accumulation of grasses and legumes in the aforementioned throat section. In addition, these known harvester designs generally employ, at least in part, the same conveying means for delivering both types of cropes to the feeding means disposed immediately in advance of the chopping knives. And in order to obtain satisfactory operation under the variations in crop and field conditions normally experienced, the conveying means, feeding devices and chopping knives must operate at a speed greatly in excess of that necessary for normal requirements, or else must be capable of being speeded up when the harvester is operating with a wide cutter bar in a heavy crop of grasses or legumes, if a satisfactory speed of travel is to be maintained. Consequently, power availability in excess of that afforded by most two-plow tractors is often necessary in order to obtain satisfactory operation which in turn necessitates employing a separate power unit for the harvester. However, as previously indicated, the provision of a separate unit results in a considerable increase in initial cost and a less effective use of available power.

In the field cutting and chopping of row crops, such as corn, it is desirable to successively deliver severed stalks to the chopping element or device, butt end first. And in so handling corn with apparatus of the types heretofore employed, considerable difficulty has been experienced, particularly in tall corn, i. e. corn stalks having a height of as much or more than eight feet, because of interference between the stalk or stalks being chopped into short lengths and those that have been severed and are being turned to a position in butt-end relation to the chopper. Moreover, in chopping the stalks into short lengths, there is less tendency for a stalk to move away from the chopping element and therefore better results are obtained, if the stalks approach the chopping element in a direction generally at a right angle to the cutting edge thereof. In addition, the chopping knives remain sharp longer and power requirements are further reduced if the severed stalks are successively delivered to an elongated chopping element in a position such that as short pieces of stalk are successively severed from the presented end thereof, movement of the stalk toward the chopping element progressively shifts the presented end of the stalk longitudinally of the chopping element. In other words, the full length of a chopping element is rendered effective in cutting a stalk into small pieces.

In accordance with the present invention, a lower initial cost and a far more efficient utilization of available power is obtained through the use of feeding devices and chopping knives of a dimension more nearly conforming with the length of the cutter bar employed in harvesting grasses and legumes, i. e. conforming with the width of cut, through the use of a grass or legume conveying means conforming with the width of cut thus eliminating the use of a narrow throat section, through the use of a separate conveying means for row crops combinable with the feeding devices in a manner effectively utilizing the entire length of the chopping knives on such scrops, and/or through combinations of cutter bars and conveying means affording separate grass and row crop units effectively combinable with the same combination of feeding devices and chopping knives, all as hereinafter more fully set forth.

And it is therefore an object of this invention to provide an improved forage harvester incorporating separate grass and row crop cutting and conveying units selectively, effectively combinable with a base unit in a manner affording an extremely efficient utilization of available power.

Another object of the present invention is to provide a base unit including chopping knives and separate grass and row crop cutting and conveying units selectively combinable with the base unit to form a traveling forage harvester incorporating a construction and combination of units eliminating the use of a narrow throat or material passage immediately preceding the chopping knives.

Still another object of this invention is to provide a forage harvester including a wide swath cutting and conveying unit for grasses and legumes detachably combinable with a base unit incorporating chopping knives having an effective length nearly equal to the width of said swath, and including a separate row crop cutting and conveying unit detachably combinable with said base unit and being operative to deliver row crop stalks to said knives in a manner effectively utilization the entire length of the knives in chopping the stalks.

It is also an object of the present invention to provide a forage harvester with a row crop cutting and conveying attachment incorporating parts constructed and combined for coaction in an improved manner operative to sequentially present severed stalks in butt-end relation to an elongated chopping device in a manner eliminating interference with respect to the movement of individual stalks.

Another object of this invention is to provide a forage harvester having a rotating cutting cylinder presenting one or more knives extending longitudinally of the cylinder axis in skewed relation thereto with a row crop cutting and conveying attachment incorporating parts constructed and combined in an improved manner operative to sequentially present severed stalks in butt-end relation and generally at a right angle with respect to the cutting edge of said knives.

Still another object of this invention is to provide a forage harvester incorporating a base unit including feeding devices and chopping knives and incorporating separate grass and row crop cutting and conveying units selectively detachably mounted on said base unit in an improved manner utilizing one of the feeding devices as a pivotal support for either attached unit and in a dual capacity with respect to one of the attached units in that it also functions as a conveying element of such unit.

Still another object of this invention is to provide a row crop cutting and conveying attachment for forage harvesters incorporating an improved construction and combination of parts operative to present and deliver severed stalks to an elongated chopping element in a manner such that the movement of stalks toward the chopping elements progressively shifts the presented end of each stalk longitudinally of such element thus rendering the full length of the element effective in cutting a stalk into short pieces.

In addition, another object of the present invention is to provide a forage harvester incorporating a base unit including feeding devices and chopping knives and incorporating a selected one of separate grass and row crop cutting and conveying units, said units including parts constructed and combined for coaction in an improved manner affording advantages as to the cost and ease of manufacture, as to combinability, and/or as to operating efficiency and effectiveness.

And therefore this invention may be considered as comprising the various constructions and combinations, all as hereinafter more fully set forth in the following detailed description and appended claims, reference being had to the accompanying drawings, in which:

Fig. 3 is an enlarged partial section taken on line III—III of Fig. 1;

Fig. 5 is a plan view of a harvester formed by combining the base and row crop units shown in Figs. 1, 2 and 4 with the belt tighteners on the row crop unit and with the ground driven shaft and sprockets, omitted;

Fig. 6 is a side view of the row crop harvester taken on line VI—VI of Fig. 5;

Fig. 8 is a top side view looking generally down into the stalk supporting chute means shown in Fig. 6;

Fig. 14 is a plan view with parts broken away of a harvester formed by combining the base and grass harvesting units;

Fig. 15 is a side view of the harvester shown in Fig. 14 with the near side wheel removed; and Fig. 16 is an enlarged side view of one of the supporting brackets carried by the upper rear frame portions of the grass unit which is similar to the row crop bracket.

Figure 1:
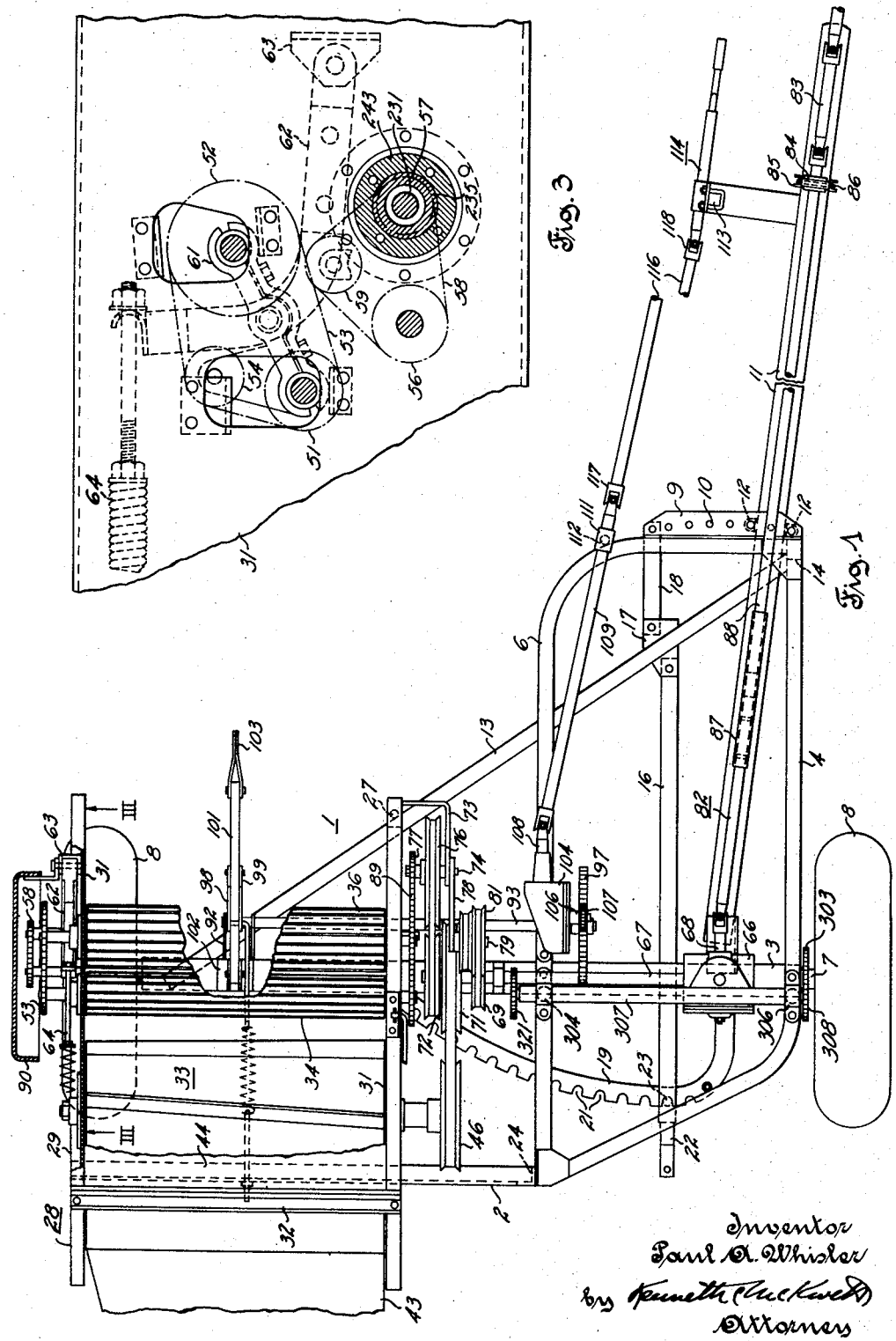
Fig. 1 is a plan view of a mobile base unit embodying the invention with parts broken away.
Figure 2:
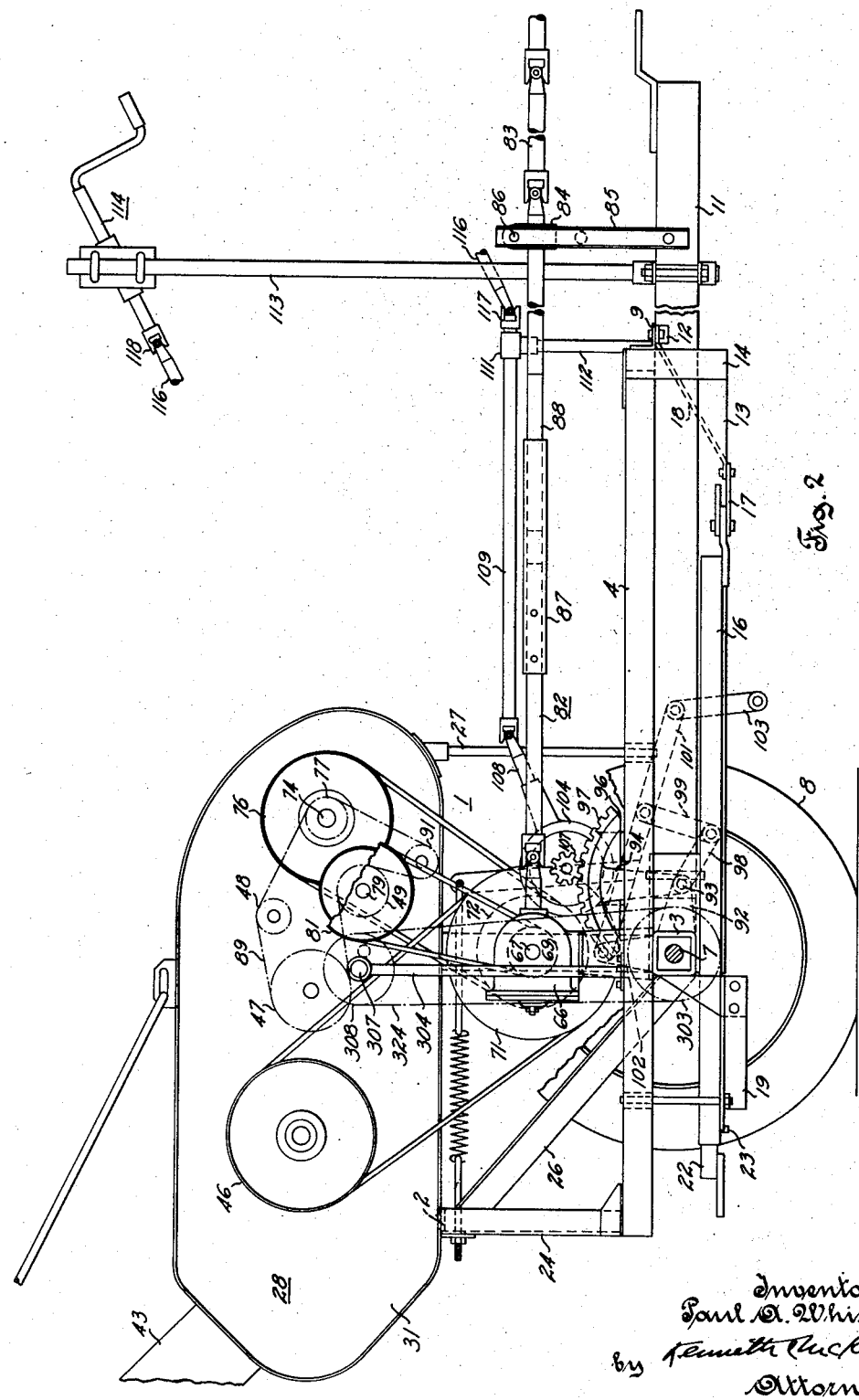
Fig. 2 is a side view with parts broken away of the unit shown in Fig. 1 with the near side wheel and gear removed.

Referring at present to Figs. 1 and 2, it will be seen that the mobile base unit 1 comprises a rigid frame structure formed by a pair of transversely disposed parallel members 2 and 3 fixedly united by a number of suitable cross members of which only members 4 and 6 connecting the near end of member 2 with the corresponding end and an intermediate portion of member 3, are shown in the interest of clarity. The opposite ends of member 3 suitably mount oppositely extending and axially aligned spindles 7 which in turn rotatably mount a pair of ground engaging supporting wheels 8. Members 4 and 6 extend forward of member 3 in laterally spaced generally parallel relation, the forward portion of member 6 being of greater length and bent laterally toward and fixedly united with the forward end of member 4 to form a generally U-shaped draft portion. The forward side of member 6 is provided with a bracket 9 having a series of spaced holes 10 therethrough arranged on an arc with respect to a point on rigid member 3 adjacent the near wheel 8. And a drawbar 11 has its rear end pivotally attached to member 3 at such point and extends forward therefrom immediately beneath bracket 9, the drawbar being provided with a pair of oppositely disposed apertured tabs 12 alignable with pairs of the holes in bracket 9 for the insertion of bolts or the like to fixedly position the drawbar in a selected angular relation with respect to the direction of travel. The forward end of the draft portion of the frame is braced by means of a diagonal member 13 having one end fixedly secured to rigid part 14 depending from the forward portion of members 4 and 6 and having its other end secured to member 3 at a point adjacent the far side thereof.

A draft bar 16 for detachably securing a wagon or the like in trailing relation to mobile unit 1 has its forward end supported for swinging movement about a vertical axis through means of a pivot support 17 secured to the underside of diagonal member 13. Draft bar supporting bracket 17 is further braced by a member 18 fixedly connecting same with the adjacent underside portion of bracket 9. The rear end of draft bar 16 is swingably supported on a rearwardly bowed member 19 having its opposite ends fixedly secured to laterally spaced, underside portions of transverse member 3. The rearwardly facing edge of this bowed member is preferably provided with notches 21 and the rear portion of draft element is provided with a longitudinally telescoping section 22 provided with a depending lug or pin 23 adapted to engage one of the notches in member 19 in the event the trailing wagon attached to the end of the draft member tends to travel forward at a rate faster than the mobile unit, it being understood that during normal operation the pin and telescoping section are free of the notches thereby permitting the draft member to swing laterally about its front pivot support. The remote side portion of the main frame, as viewed in Fig. 2, is provided with a plurality of upwardly extending members 24, 26 and 27 fixedly supporting a housing 28 in spaced elevated relation with respect to underlying frame members 2, 3 and 13, this housing comprising similar side members 29, generally parallel side plates 31, and suitable cross members 32 (note Fig. 5) of which only one is clearly shown in the interest of simplicity.

Housing 28, reference being also had to Fig. 6, operatively mounts and encloses a rotating chopping device or cylinder 33 and a crop feeding device 30 which may include pairs of upper and lower feed rolls 34, 36 and 37, 38, respectively, disposed immediately in advance of the chopping device, the latter coacting with a suitable shear bar 39 to effect a chopping or severing of material fed thereto. Chopping device 33 presents a series of blades 35 mounted in skewed relation to the axis of rotation of cylinder 33. It will be noted that the housing, which substantially encloses the rotary chopping device, is provided with a material receiving opening 41, a material discharge opening 42 communicating with an upward and rearwardly extending spout 43 of which only a portion is shown, and with a cover element 44 affording access to the top side of the chopping device. The chopping device and feed rolls are suitably mounted for rotation about generally parallel horizontal axes through means of shaft portions and bearings suitably supported in opposed portions of side plates 31. And in this connection it will be noted that the sides of housing 28 extend forwardly beyond upper and lower feed rolls 36 and 38 to provide space for receiving an attachment therebetween, as hereinafter described.

The near exposed end of the chopping device shaft fixedly mounts a pulley 46 and the corresponding shaft ends of both upper feed rolls 34, 36 and of the lower forward feed roll 38 are provided with sprocket wheels 47, 48 and 49, respectively. The far side shaft ends, note Fig. 3, of both upper feed rolls are also provided with sprockets 51 and 52 which are drivingly connected by means of a chain 53 passing therearound and also around a chain tightening sprocket 54. Likewise, the far side shaft ends of both lower feed rolls are similarly drivingly connected through sprockets 56 and 57 having a chain 58 passing therearound and also around an idler sprocket 59. The bearings supporting the far and near side shaft end portions of upper feed rolls 34, 36 are adjustably supported through similar means (of which only one is shown) comprising a detachable element 61 pivotally supported on an intermediate portion of a rigid arm 62 which is in turn supported at one end for vertical swinging movement about a transverse horizontal axis afforded by a pivot support 63, the opposite end of bar 62 being adjustably connected with a fixed portion of housing 28 (not shown) through a resilient means 64 acting to maintain the upper rolls in a predetermined releasable position relative to the lower rolls.

Transverse frame member 3 fixedly detachably supports a gear box 66 enclosing and supporting one end of a shaft 67 which extends inward therefrom in parallel relation to member 3, shaft

67 having its gear box enclosed end gear connected with a forwardly disposed stub shaft 68. The inner or far side end of shaft 67 is supported on member 3 and fixedly mounts three axially spaced pulleys 69, 71 and 72 for rotation therewith, pulley 71 being disposed in driving alignment with the pulley 46 on the adjacent shaft end of the chopping device. The near forward side of housing 28 is provided with a bracket 73 rotatably supporting a stub shaft 74 disposed in parallel relation to shaft 67 and with respect to the axis of feed rolls 34, 36, 37 and 38. Shaft 74 mounts a pulley 76 in driven alignment with the pulley 72 on shaft 67 and a sprocket wheel 77 aligned with the sprockets on the adjacent ends of lower front feed roll 38 and on both upper feed rolls 34 and 36. Bracket 73 is provided with a rearward extension 78 which detachably mounts a stub shaft 79 disposed in parallel relation to shaft 67 and stub shaft 74, shaft 79 being disposed in substantial axial alignment with the shaft of lower forward roll 38. Stub shaft 79 mounts a dual pulley 81 having one element thereof disposed in driven alignment with the pulley 69 on shaft 67. Power for operating shaft 67 is obtained from a forwardly extending shaft 82 having its rear end universally connected with the forward end of shaft 68 projecting from gear box 66 and having its forward end provided with a universally connected section 83 adapted for connection with the rear end of a tractor power take-off shaft (not shown). Power transmitting shaft 82 has its forward end rotatably supported in a bearing 84 which is in turn supported on a standard 85 pivotally mounted on a forward portion of the drawbar or tongue 11 for fore and aft swinging movement relative thereto. Preferably bearing 84 is mounted on standard 85 by means of a pivot support 86 affording limited pivotal movement of the bearing about a transverse horizontal axis with respect to the standard. Power transmitting shaft 82 comprises telescoping sections 87 and 88 affording longitudinal movement of the forward end thereof relative to the rear portion universally connected with gear box shaft 68. In view of the foregoing it should now be obvious that power for driving the chopping device and feed rolls is derived through shaft 82, gear box 66 and shaft 67, through belt connections between pulleys 69 and 81, between pulleys 71 and 46, and between pulleys 72 and 76, and by means of a chain 89 running around sprocket 77, sprocket 48, sprocket 47, sprocket 49, and around an idler sprocket 91 detachably mounted on the near side of housing 28. And it should now be obvious that lower rear feed roll 37 is driven from the far side of housing 28 through means of the chain 58, as previously described. Preferably in the interest of safety the sprocket wheels and chains on the far side of housing 28 are covered with a readily demountable shield 90.

Referring again to Figs. 1 and 2, it will be seen that an intermediate portion of transverse frame member 3 is provided with a pair of laterally spaced and aligned forwardly projecting rigid brackets 92 mounting a shaft 93 disposed in generally parallel relation to member 3. The near end of shaft 93 is provided with an upwardly extending arm 94 fixed thereto, this arm terminating in a fore and aft arcuate portion 96 provided with gear teeth 97. The opposite end of shaft 93 has an arm 98 fixed thereto for movement therewith and a link 99 pivotally connects the free end of this arm with an intermediate portion of a lever 101 having its rear end pivotally supported on a bracket structure 102 superimposed on transverse frame member 3. Lever 101 is supported for vertical swinging movement about a horizontal axis generally parallel to member 3 and has its forward or free end provided with a link 103 connectable in supporting relation to the underside of a grass or row crop attachment, as will be hereinafter described.

A gear box 104 is mounted on frame member 6 in overlying adjacent relation to the near end of shaft 93 and supports a projecting stub shaft 106 which is parallel to shaft 67 and is provided at its outer end with a pinion 107 meshing with the arcuate rack formed on arm 94. Gear box 104 also rotatably supports a forwardly extending stub shaft 108, it being understood that the gear box enclosed ends of shafts 106 and 108 are suitably connected so that a rotation of shaft 108 imparts a corresponding rotation to shaft 106 and pinion 107 and that the gearing connecting shafts 106 and 108 is so constructed in a well known manner (and not shown) whereby rotation of shaft 106 takes place only when shaft 108 is rotated. The forward end of shaft 108 is universally connected with a forwardly projecting section 109 rotatably supported in a bearing 111 carried by a standard 112 extending upward from a forward portion of frame member 6. The forward portion of tongue 11 is provided with an upwardly extending standard 113 suitably mounting a stub shaft and hand crank assembly 114, the rearward end of this stub shaft being operatively connected with the forward end of shaft 109 by means of an intermediate section 116 and universal joints 117 and 118. And in view of the foregoing it should now be obvious that upon turning the crank, the pinion 107 on stub shaft 106 coacts with the arcuate rack 97 on shaft 93 to impart a turning movement to the latter, thereby effecting a raising or lowering movement, as desired, of the forwardly extending lever 101.

Figure 4:
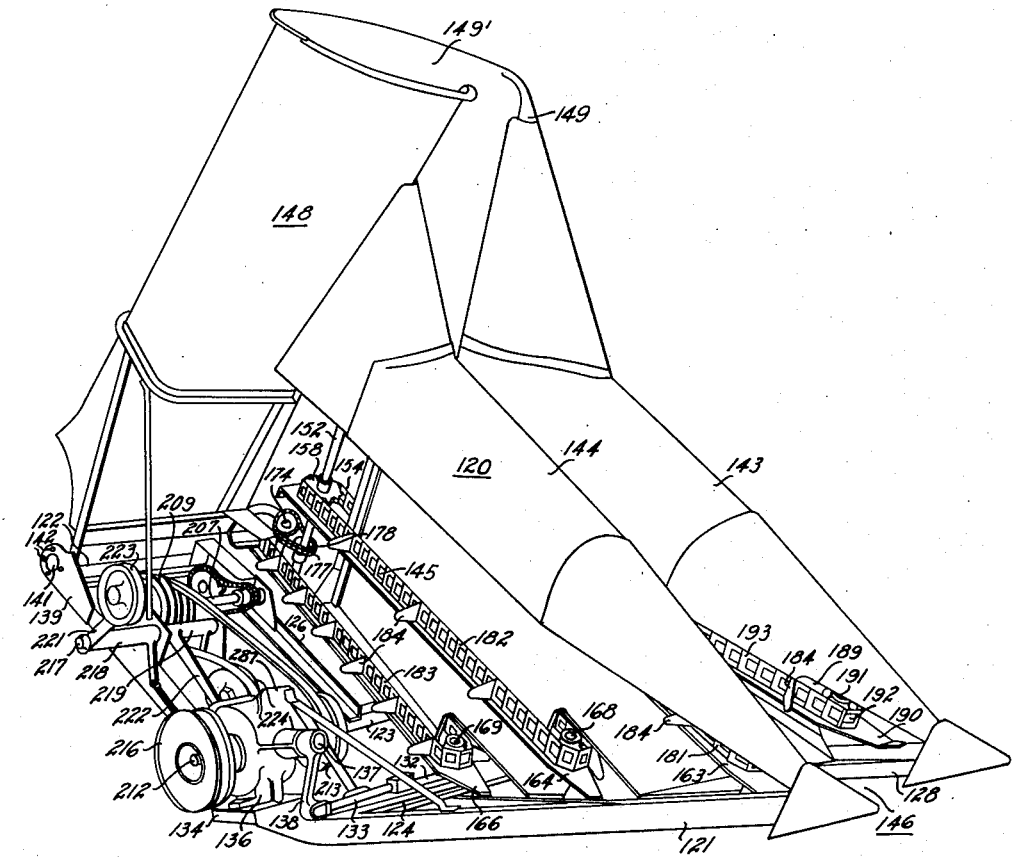
Fig. 4 is a perspective view of a row crop unit detachably mountable on the base unit.

Referring to Figs. 4, 5 and 6, it will be seen that the row crop harvesting unit 120 comprises a generally rigid frame structure formed by outer side members 119 and 121 having rearwardly diverging horizontal forward portions and rear portions inclined upwardly from the forward portions in parallel relation with respect to each other, these side members being fixedly united by a plurality of cross members 122, 123 and 124 and additionally by longitudinally extending members 126 and 127. An additional pair of longitudinally extending members 128 and 129 have their rear end fixedly secured to laterally spaced portions of front cross member 124 and extend forward therefrom in parallel passage forming relation to a point near the front end of the unit whereupon member 128 diverges outwardly and is joined with the forward end of side member 119. Member 129 extends forward from cross member 124 in straight line relation to its junction with the forward end of side member 121. The forward side of cross member 124 carries a pair of laterally spaced brackets 131 operatively supporting a row crop cutting device or cutter bar and sickle mechanism 132, the near side of the latter being provided with an outwardly extending pitman 133. Near side member 121 is provided with an enlargement or support part 134 immediately to the rear of cross member 124 and a wobble box 136, that is a box containing means for converting rotary motion to oscillating motion, is detachably mounted on this support and presents a forwardly extending oscillating stub shaft 137 on which is secured a depending arm 138 positioned for detachable connection with the adjacent end of pitman 133. The rear ends of side members 119 and 121 are provided with a pair of fixed rearwardly extending parts 139 (see also Fig. 16) having transversely aligned openings 141 therethrough and a surrounding series of bolt holes 142. And it should be understood from the description thus far that when the row crop unit is attached to a base machine or unit the part of the frame defined by the forward portions of side members 119 and 121, by cross member 124, and by longitudinally extending members 128 and 129, is adapted to rest on or be positioned in adjacent parallel relation to the ground with the rear portion of the frame extending upward and rearward therefrom to its points of support on the base unit.

Figure 10:
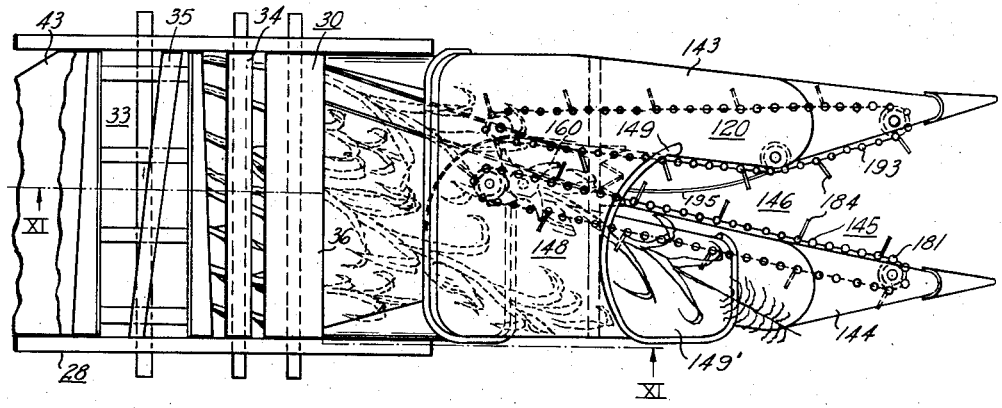
Fig. 10 is a partial plan view drawn to a smaller scale illustrating the manner in which stalks are severed and fed to the chopping device.

The frame structure just described mounts a pair of sheet metal sections or gathering elements 143 and 144 presenting spaced inner opposed vertical wall portions defining a passage 146 having a forward portion generally conforming with the spacing of frame members 128 and 129 and extending rearwardly and gradually upward from their front ends to a point adjacent the far rear side of the unit as viewed in Fig. 5. The bottom edges of the opposed passage forming wall portions of sections 143 and 144 are secured to a pair of laterally spaced longitudinal frame members 147 which extend upward from front cross member 124 to rear cross member 122, one of which is clearly shown in Fig. 6. Also mounted on the frame of the unit is a severed stalk deflecting mechanism generally indicated by the reference character 148 and which comprises chute-like sheet metal section 149 which is joined with the rear edge portions of sections 143 and 144 to form a continuation of passage 146 and provide a laterally offset enlargement or trough 149' thereof (see Fig. 8) affording a rearward downwardly inclined surface or floor 150 (see Fig. 11) on which stalks may be positioned to extend generally transversely of the unit with their butt-ends disposed adjacent the far rear side thereof as indicated in Fig. 10. The spaced opposed wall portions of sections 143 and 144 in advance of frame cross member 124 provide a stalk receiving throat and narrow passage section 146 by means of which the butt-ends of standing stalks are guided into severing relation to the sickle or cutter bar 132 as the unit travels along a crop row. And in order to afford a support for the butt ends of severed stalks as they are moved rearward and upward through passage 146, a bottom plate or floor 151 (note Fig. 11) is secured to frame members and spans the opening between the lower edges of the inner opposed wall portions of sections 143 and 144.

Figure 11:
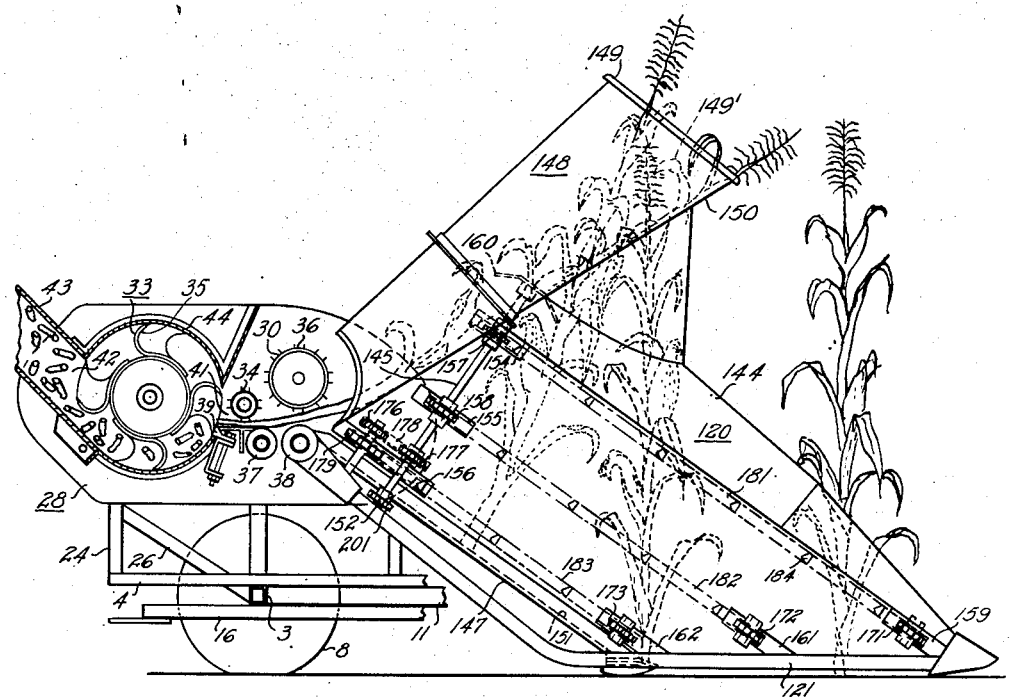
Fig. 11 is a partial sectional view taken generally on line XI—XI of Fig. 10.

A severed stalk conveying mechanism 145 is provided to convey severed stalks in single file through passage 146 and sequentially position the stalks butt end first in chute 148 as indicated in Figs. 10 and 11, a shaft 152 is rotatably supported immediately adjacent the outer rear side wall of section 144, this side wall being provided with vertically spaced longitudinally staggered openings 153, 154, 155 and 156. The opening 153 receives a star wheel or deflecting member 160 which is fixed to the top end of shaft 152 and the openings 154 and 155 receive sprocket wheels 157 and 158 all of which are secured to shaft 152 for rotation therewith. In addition, the forward portion of this wall is provided with vertically spaced longitudinally staggered openings 159, 161 and 162 which are similar to and aligned with the openings 154, 155 and 156, respectively. And a plurality of longitudinally extending members 163, 164 and 166, one being disposed immediately beneath each pair of longitudinally aligned openings, support fixed stub shafts 167, 168 and 169 rotatably mounting sprocket wheels 171, 172 and 173, which project through the associated opening with the wheels 171 and 172 aligned with the sprocket wheels 157 and 158, respectively, on shaft 152, the latter also extending through and being in part supported by members 163, 164 and 166. A short vertically extending shaft 174, which is disposed to the rear of and parallel to shaft 152, extends from a point below the floor of passage 146 upwardly to a point above the lower end of shaft 152, the upper end of shaft 174 being provided with a sprocket 176 aligned with a sprocket 177 secured to the lower end portion of shaft 152. A chain 178 passes around the aligned sprockets on shafts 174 and 152 to establish a driving connection therebetween. A lower portion of shaft 174 mounts a sprocket 179 in position immediately above the floor of passage 146, this sprocket projecting through the lower rear opening 156 in the wall portion of section 144. A stalk gathering and conveying chain passes around each pair of longitudinally aligned sprocket wheels, i. e. a chain 181 passes around sprockets 157 and 171, a chain 182 passes around sprockets 158 and 172, and a chain 183 passes around sprockets 179 and 173. The gathering and conveying chains are each provided with similar stalk engaging flights 184 which project into passage 146 and travel rearwardly therethrough as indicated in Fig. 5. A short vertical shaft 186 is mounted adjacent the upper outer rear side wall of section 143 in generally parallel relation to shaft 152 and mounts a sprocket 188 on the top end thereof in laterally opposed parallel relation to sprocket 157 on shaft 152. The forward passage forming wall portion of section 143 is provided with an opening 189 therethrough which is opposite the opening 159 in section 144 and which is longitudinally aligned with the sprocket 188 on the top end of shaft 186. A longitudinally extending member 190, similar to member 163, extends immediately beneath opening 189 and mounts a fixed stub shaft 191 which in turn rotatably supports a sprocket wheel 192. A gathering and conveying chain 193 passes around sprockets 188 and 192 and is also provided with flights 184 which project into passage 146 preferably in staggered relation to similar flights on the opposed chain 181. And since the active course of chain 193 does not follow a straight line path, the passage forming side wall of section 143 is provided with two additional openings (not clearly shown) in longitudinal alignment with the opening 189 and a pair of idler sprockets 180 and 185, which are also mounted on member 190, project through these openings and guidingly engage the active course of chain 193. And in order to insure that the stalks are sequentially severed and thereafter move rearwardly in single file toward chute 148, a flat spring element 195 has its forward end secured to frame member 128 at a point adjacent guide sprocket 185 and extends rearward in curved converging relation to the opposite side wall of passage 146, this spring element closely approaching the opposite vertical wall portion of section 144 immediately in advance of cutter bar 132 and extends rearward therealong in overlying relation to lower chain 183 and to a point adjacent the rear edge of section 144.

Figure 9:
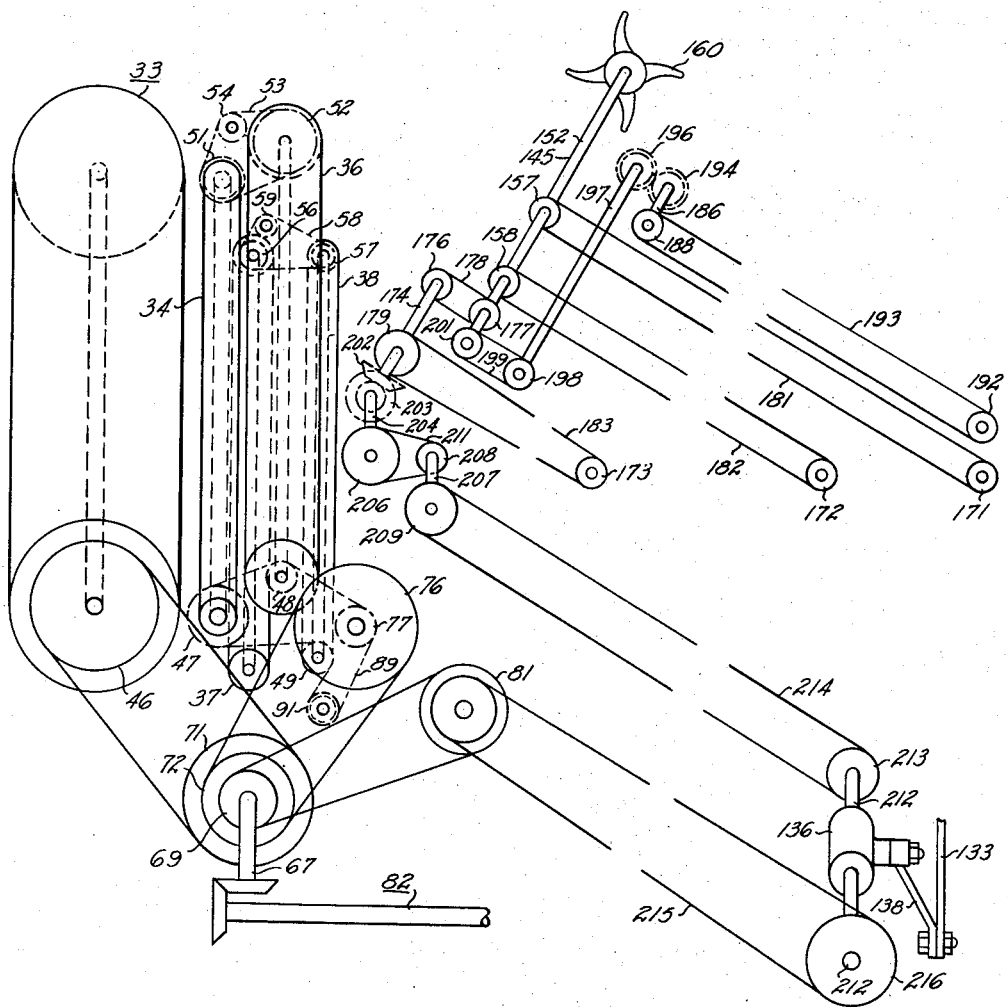
Fig. 9 is a schematic showing of the drive mechanism incorporated in the harvester shown in Figs. 5 and 6.

The lower end of shaft 186 is provided with a gear 194 (see Fig. 9) which is in mesh with a gear 196 on the upper end of a vertically disposed parallel shaft 197 that extends downward to a point below the bottom wall or floor of passage 146. The bottom end of shaft 197 is provided with a sprocket wheel 198 and a driving connection is established between shafts 152 and 197 by means of a chain 199 which passes around sprocket 198 and around an aligned sprocket 201 secured to a lower end portion of shaft 152 immediately below the floor of passage 146. The extreme lower end of shaft 174 mounts a bevel gear 202 in mesh with a complementary gear 203 on the adjacent end of a cross shaft 204, the outer or opposite end of shaft 204 mounting a sprocket wheel 206. Another cross shaft 207 is supported on the top side of frame members 126 and 127 in forward vertically spaced parallel relation to shaft 204, shaft 207 mounting a sprocket wheel 208 on its inner end aligned with the sprocket wheel 206 on the adjacent end of shaft 204 and mounting a stepped multiple pulley 209 on its outer end. A chain 211 passes around sprockets 206 and 208 and establishes a driving connection between shafts 204 and 207. Wobble box 136 mounts a shaft 212 which projects from opposite ends thereof and which is positioned in parallel relation to shaft 207 upon attachment of the wobble box to the support 134 afforded by frame member 121, as previously described. The inner projecting end of shaft 212 mounts a stepped pulley 213 aligned with and complementary to the pulley 209 on shaft 207 and a belt 214 positioned around these pulleys transmits power from the wobble box to shaft 207. The outer projecting end of shaft 212 mounts a pulley 216 likewise alignable with a pulley on the base unit. In addition (see Fig. 4), frame member 121 mounts a fixed cross shaft 217 presenting oppositely extending portions on which are rotatably mounted sleeve elements 218 and 219 provided with fixed arms 221 and 222 which in turn support fixed stub shafts rotatably mounting belt tightening pulleys 223 and 224 aligned with the pulleys on the opposite end portions of wobble box shaft 212.

Figure 7:
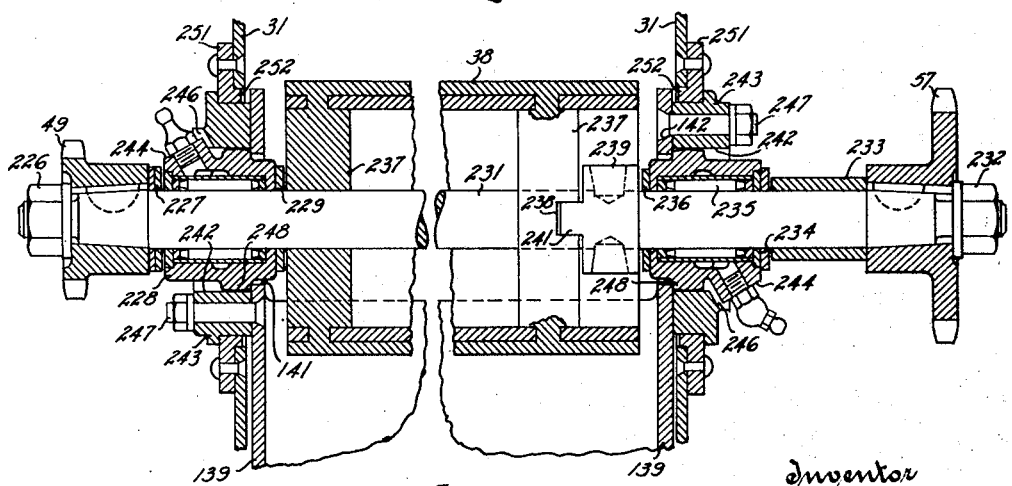
Fig. 7 is an enlarged section through the lower feed roll taken on line VII—VII of Fig. 6.

Assuming the row crop unit shown in Fig. 4 is to be attached to the base unit previously described, the first step is to remove shield 90 from the far side of housing 28, thereby exposing sprockets 56, 57 and 59 and chain 58, and remove the latter. Next remove the belt on the near side of the machine connecting pulleys 69 and 81, remove stub shaft 79 and dual pulley 81, remove the chain 89 driving sprockets 47, 48 and 49, and then remove nut 226, sprocket 49, washers 227, bearing 228 and washer 229 from the right end of lower feed roll shaft 231 (left hand end of shaft as seen in Fig. 7). When this has been done shaft 231 may be withdrawn from the far side of housing 28 with the nut 232, sprocket 57, sleeve 233, washer 234, bearing 235 and washer 236 positioned thereon since the lower feed roll proper is hollow and loosely supported on shaft 231 by means of fixed internal annular end rings 237 and since a driving connection between shaft 231 and roll 38 is established by means of diametrically opposed clutch jaw receiving recesses 238 formed in the face of the annular ring 237 which faces outwardly with respect to the far side of the machine, and by means of a clutch element 239 fixed to shaft 231, as by welding, and provided with diametrically opposed inwardly extending jaw projections 241 complementary to and receivable in the recesses 238. In this connection it will be noted that the external diameter of clutch element 239 is less than the diameter of the central opening 242 in the adjacent one of the similar pivot rings 243, the latter slidably receiving the bearing 235. Rotation of the bearings 228 and 235 relative to the associated ring 243 is prevented by means of lubricant fitting receiving bosses 244 disposed in a complementary radially extending recess 246 formed in the pivot rings. The description thus far, particular reference being had to Fig. 7, has proceeded on the assumption that as to the base unit the lower feed roll 38 is supported and retained in housing 28 essentially by means of the pivot rings 243, bearings 228 and 235, etc. carried by shaft 231. And in this connection it should be apparent that a material lateral shifting of the roll 38 relative to housing 28 is prevented by the coaction of lubricant receiving bosses 244 with the inner opposed surface of the recesses 246 formed in the pivot rings 243. Consequently, if Fig. 7 is to be considered as illustrating the manner in which the lower feed roll is supported prior to the attachment of the row crop unit, it must be borne in mind that the row crop unit support parts 139 and the bolts securing same to the pivot rings, would not be seen.

Upon withdrawal of lower feed roll supporting shaft 231 and removal of the lower hollow feed roll 38, as previously described, the next step in attaching the row crop unit to the base unit is to position the upper rear end of the row crop unit between the laterally spaced side walls of housing 28 with the enlarged openings 141 in support parts 139 aligned with the openings afforded by pivot rings 243. When this has been done the next step is to shift the rear end of the row crop unit until the bolt holes 142 in support parts 139 are in alignment with the corresponding holes in the pivot ring 243 whereupon a punch or the like may be inserted through a pair of these aligned holes to maintain these parts in correct position for the insertion of bolts 247 through the remaining holes, thereby securing the rear supporting parts 139 on the row crop unit in fixed side abutting relation to the inner surfaces of the pivot rings 243, as clearly indicated in Fig. 7. When this has been accomplished, the punch may be removed and a bolt inserted in lieu thereof. And all that remains to be done in order to complete the assembly is to position hollow roll 38 between the side walls of housing 28 in substantial axial alignment with the central holes in pivot rings 243 whereupon shaft 231 may be inserted from the far side of the machine and supported in the relation shown in Fig. 7 simply by replacing washer 229, bearing 228, washers 227, sprocket wheel 49 and nut 226. In this connection it will be noted that the central holes 141 in row crop unit support parts 139 are of slightly smaller diameter than the corresponding holes in the pivot rings, thus providing an annular shoulder adapted to be side abutted by a peripheral flange 248 on the bearing housings as shown. Therefore it should be obvious that when the parts have been assembled in the general relation shown in Fig. 7 a tightening of nut 226 will maintain this assembly in the position shown. And all that remains to be done in order to complete the mounting of the row crop unit on the base unit is to connect the link 103 on the forward end of lever 101 with a depending pivot support 249 on the bottom side of the unit, thereby rendering the lifting mechanism actuated by hand crank assembly 114 operative to effect a raising and lowering of the row crop unit about the pivot supports afforded by pivot rings 243, the latter being rotatable in a complementary opening preferably formed by reinforcing plate members 251 surrounding the somewhat larger aligned openings in the side walls 31 of housing 28, these plate-like members including an inner peripheral flange 252 affording a turning seat for the pivot ring.

Upon having completed the attachment of the row crop unit as just described, all that remains to be done, assuming the tongue 11 has been attached to a propelling tractor and the power transmitting shaft 82 connected with a power take-off on the tractor, is to replace chain 58 around sprockets 56, 57 and 59, replace shield 90, replace chain 89 around sprockets 47, 48 and 49, reattach dual pulley 81 to bracket extension 78, place a belt around pulley 69 and one section of dual pulley 81, and place a belt 215 around the other section of dual pulley 81 and the pulley 216 on the outer end of wobble box shaft 212. When this has been accomplished, it will be seen, reference being had to Fig. 9, that upon delivery of power through shaft 82, gear box 66 and shaft 67, the latter drives the wobble box 136 through its belt connection with step pulley 81, drives the chopping device 33 through the belt connection between pulleys 46 and 71, and drives the stub shaft 74 on brackets 73 through a belt connection with pulleys 72 and 76. It should therefore be obvious that the power transmitted from gear box 66 will result in a rotation of chopping device 33, of all four feed rolls and of wobble box cross shaft 212 which reciprocates sickle bar 132. Moreover, it should now be apparent that rotation of wobble box cross shaft 212 imparts an oscillating motion to the arm depending from the forward end of oscillating shaft 137 which in turn drives the cutter bar mechanism 132 and that the belt connection between the step pulley 213 on the inner end of wobble box shaft 212 and the aligned pulley 209 on cross shaft 207 results in a rotation of the latter which in turn rotates cross shaft 207 and by means of the gears and sprockets also the shafts 152 and 197.

If it now be considered that the harvester comprising the base and row crop unit combined as previously described is being drawn through a field of corn with the throat portion of passage 146 in stalk receiving relation to a row of standing corn, it will be seen that the movement of the upper conveying and gathering chains 181 and 193 which are operating at ground speed aid in gathering the stalks into throat 146. Then as the row crop unit progresses down the field the middle gathering chain 182 also contacts the standing stalks of corn and just before the stalks contact the sickle bar 132, the stalks are engaged by spring element 195 and are thereby pushed against the opposite side wall of passage 146 at which time the stalk is severed by the sickle and a lower portion of the stalk is contacted by the lower gathering chain 183, the spring 195 acting to maintain the lower portions of severed stalks in conveyed relation to lower chains 182 and 183 until the butt end of the stalk is just about to leave the floor member 151 and the mid-portion of the stalk is about to be contacted by star wheel 160. The movement of the gathering and conveying chains 181, 182 and 183 rearwardly through passage 146 operates on severed stalks to move same rearwardly through passage 146 with the butt end of the stalks engaging the floor 151 and with the butt end of the stalk moving rearward more rapidly than the upper portion thereof, the last mentioned action being accomplished by the differential feeding action of chains 181, 182 and 183, the upper opposed chains 181 and 193 traveling at substantially equal rate and at a speed less than the next lower chain 182 which in turn travels at a speed less than the chain 183 immediately overlying the bottom wall 151 of the passage. As a result when the stalks reach a position adjacent the rear edge of section 144 the stalk is disposed in a position such that its butt end is adjacent to and approaching the far side of the feeding device as viewed in Fig. 10 and the stalk extends forward and upward away from the feeding device in generally parallel relation to the merging device of the rear outer side wall portion of passage 146 and the forward or bottom edge of chute 148 whereupon engagement of the star wheel 160 with an intermediate portion of the stalk immediately shifts same laterally of the enlarged chute portion 149 and into the position generally shown in Fig. 10. Or in other words, just as the butt end of the stalk is about to be grasped by feed rolls 36 and 38, star wheel 160 strikes a mid-portion of the stalk causing the stalk to pivot about its butt end until the upper portion of the stalk is moved out of narrow passage 146 and enters enlargement or trough 149 and rests on surface 150 out of the way of oncoming stalks as shown in Fig. 10 with the tassel end of the stalks longitudinally aligned to be fed to the near end of the chopping cylinder by the feeding rolls. That is, in a position in such angled relation to the feed rolls 36 and 38 that the stalks pass therethrough in an angled relation to the chopping device 33 such that the presented end of the stalk is progressively shifted longitudinally of the feed rolls from one side thereof to the other as the stalks are fed thereto such that the butt end of a stalk is chopped up by one end of chopping device 33 while the tassel end of the same stalk is chopped up by the other end of device 33. And since it should now be obvious that the stalks are delivered in single file or one at a time to the rear end of the passage as just described, the star wheel 160 operated to sequentially position the stalks in angled relation to chute 148 so that the stalks pass through the feeding and chopping devices in the manner described and without interference with one another thereby utilizing the effective length of the chopping device 33 at all times.

Figure 12:
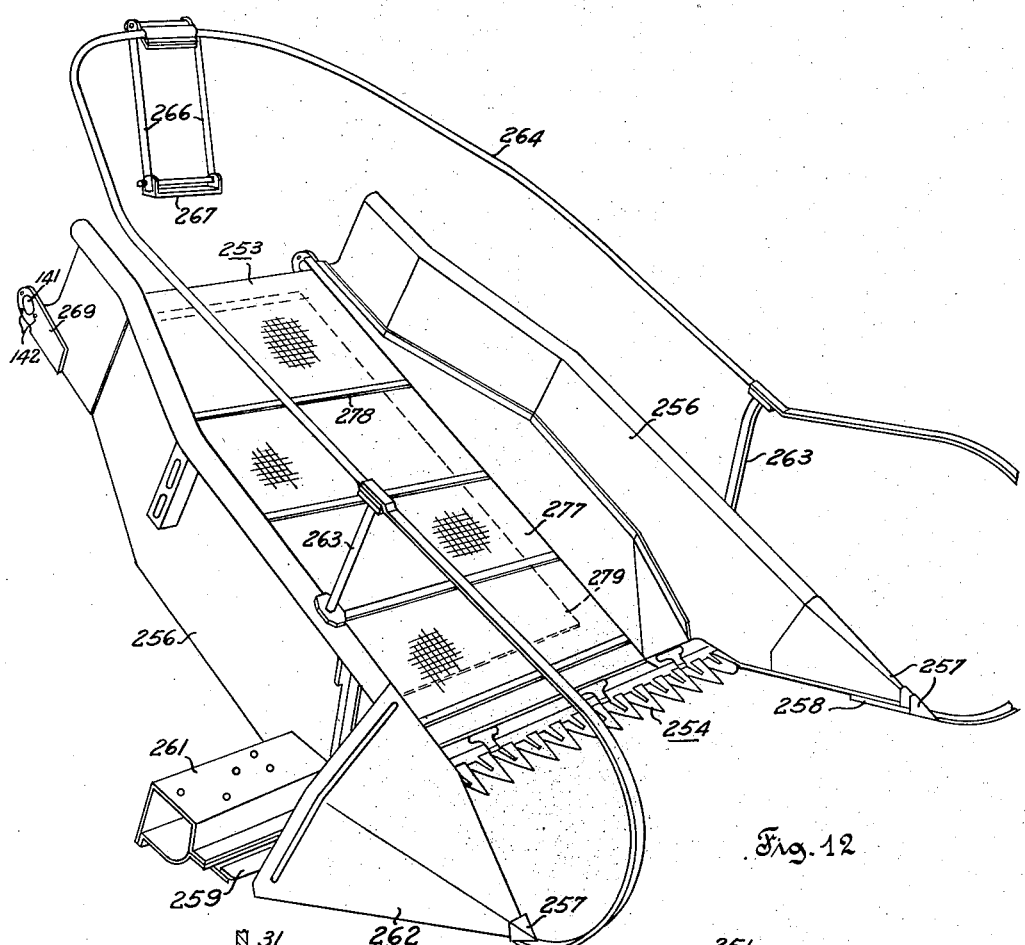
Fig. 12 is a perspective view of a grass harvesting unit detachably mountable on the base unit.

Referring to Figs. 12, 14 and 15, it will be seen that a grass attachment embodying the invention comprises a unitary structure including an endless driven type conveyer 253 having an effective width substantially equal to the effective width of the feeding device, that is substantially equal to the effective length of feed rolls 36 and 38, and substantially equal to the effective length of the chopping device 33, and an elongated cutter bar and sickle or mower mechanism 254 disposed immediately in advance of conveyer 253 in lateral symmetrical relation thereto, and including material confining side walls 256 extending from the rear end of the structure forwardly along opposite sides of conveyer 253 and to points in advance of the opposite ends of the cutter bar or mower 254. The forward end portions of side walls 256 terminate in divider points 257 having base or shoe portions 258 adapted to rest on or to be disposed in proximate parallel relation to the ground when the grass unit is attached to the base unit 1 as hereinafter described. The cutter bar or mower 254 and side walls 256 are supported in part on a transverse cross member 259 which extends outwardly beyond the near side wall and presents a tubular bracket like support 261 for wobble box 136. And in order to adequately shield this bracket and the wobble box mounted thereon (when the latter is attached to such support) the near side divider 257 includes a rearwardly and outwardly flared sheet metal portion 262 which is substantially coextensive with the extension of cross member 259 and with the combined height of the wobble box and support therefor. The cutter bar or mower 254 is of a length practical for the efficient cutting of grass crops.

A pair of standards 263 extend upward from opposed forward portions of side walls 256 and support a generally U-shaped rail 264 positioned in spaced overlying relation to the top edges of the side walls. The opposed forward end portions of this rail curving downward and rearward beneath and being secured to the bottom edge of divider points 257 in skid or runner relation thereto. The rear portion of rail 264 carries a connector comprising a pair of bars 266 pivotally attached thereto and depending therefrom in spaced parallel relation with respect to each other, these bars having their remote ends united and presenting a pivoted part 267 attachable to the top side of base unit housing 28. The unitary structure also comprises generally parallel similar side frame members 268 (see Fig. 14) united by cross member 259 and by additional cross members (not shown). The rear end of side frame members 268 mount rearwardly extending parallel supports 269 similar to the corresponding parts of the row crop unit even as to the aligned shaft receiving openings 141 and as to the bolt receiving openings 142 surrounding openings 141. The underside of the unitary structure is additionally braced by means of a downward bowed longitudinal member 271 having its opposite ends connected with a rear cross member (not shown) and with a transverse cross member 272, and by means of a vertically disposed member 273 fixedly uniting the mid-portion of bowed member 271 with a corresponding part of the floor structure. The rear side of vertically disposed member 273 mounts a pivot support 274 adapted for connection with the forward end of link 103 on lever 101. The conveyer 253 comprises a lower roll 276 supported in bearing structures (not shown) mounted on opposed forward portions of side members 268 immediately to the rear of cutter bar 254. And an endless element 277 which carries transverse raddle bars 278, passes around roll 276 with its active and inactive courses traveling respectively above and below a floor structure 279. Preferably the endless conveying element 277 is separable in the usual manner to afford removal of same from the driving and driven rolls therefor. In this connection upper roll element (see Fig. 13) comprises a hollow cylinder 281 incorporating annular internal end rings 282 having axially aligned openings therethrough dimensioned to slidably receive shaft 231, the outer surface of the ring facing the far side of the machine being provided with diametrically opposed clutch jaw receiving recesses 283 complementary to the jaw projections 241 on clutch element 239 fixed to shaft 231. Thus it will be seen that the construction of the feed and conveyer roll elements are in general identical except as to their diameters and except as to the nature of their outer surfaces.

Figure 13:
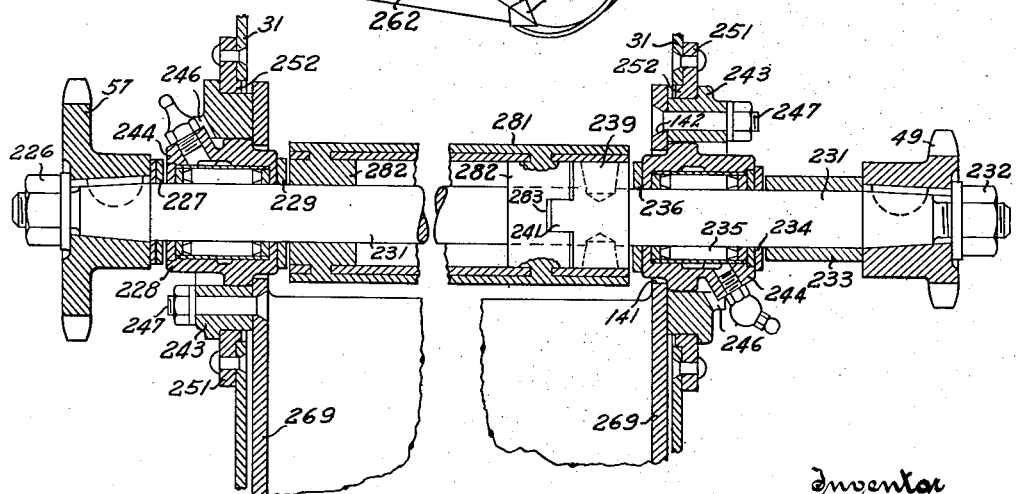
Fig. 13 is a view similar to Fig. 7 taken on line XIII—XIII of Fig. 15 showing a conveyer roll element substituted for the usual feed roll.

When it is desired to attach the grass unit to the base unit in place of the row crop unit attached thereto as previously described, the lift mechanism is actuated to position the forward end of the row crop unit on the ground and the link 103 on lever 101 is disconnected from the underside support, shield 90 is removed from the far side of the machine, chain 58 is removed from sprockets 56, 57 and 59. The belts are removed from dual pulley 81 and, the stub shaft 79 and stepped pulley 81 are removed from bracket extension 78, chain 89 is removed from sprockets 47, 48 and 49 and the nut 226, sprocket 49, washers 227, bearing 228 and washer 229 are removed from the near side end of shaft 231 (the left hand end of the shaft as viewed in Fig. 7), whereupon this shaft is withdrawn from the feed roll through the far side of housing 28, and roll 38 is removed from the housing. When this has been done one of the bolts 247 uniting each support part 139 with a pivot ring 243 is removed and a punch or the like is inserted in place of the removed bolts whereupon the remaining bolts may be removed, the punch withdrawn, and the row crop unit pulled from between the forward side wall portions of housing 28. The next step is to position the rear end of the grass unit between the spaced forward portions of the side walls of housing 28 with the enlarged openings 141 and bolt holes 142 in support parts 269 aligned with the corresponding openings in pivot rings 243, and insert a punch or the like between a pair of the aligned bolt receiving openings. When this has been done bolts 247 are inserted in the remaining holes and tightened to secure support parts 269 in fixed side abutting relation to pivot rings 243, the punch withdrawn and a bolt inserted in lieu thereof. Conveyer roll element 281 (see Fig. 13) is next positioned between the side walls of housing 28 in axial alignment with the opening 141 in supporting parts 269, shaft 231 is inserted therethrough from the far side of the machine and the washer 229, bearing 228, washers 227, sprocket 57 and nut 226 are replaced on the near side thereof (left hand end as shown in Fig. 13). And since the construction of conveyer roll element 281 is in general identical to the construction of feed roll 38, it will be obvious that the insertion of shaft 231 through the conveyer roll element establishes a driving connection therewith through engagement of shaft clutch element 239 with the jaw receiving recesses 283 in the opposed face of internal ring 282. In most instances, it is desirable to rotate conveyer roll element 281 at a speed different from that of feed roll 38, and consequently different size sprockets are usually employed. And in the interest of simplicity it is preferable to so design the rolls and sprockets that the desired change in speed of rotation is obtained by merely interchanging the sprockets positioned on the opposed ends of shaft 231, this change being indicated by Fig. 13 wherein sprockets 49 and 57 are reversed.

The grass unit is now attached to the base unit through coaction of support parts 269 and pivot rings 243, exactly in the same manner as described with respect to the row crop unit, and all that remains to be done in order for the grass unit to be supported on the base unit for movement therewith is to attach the link 103 on lever 101 to pivot support 274 on the underside of the grass unit. Conveyer roll element 281 is now supported for rotation with shaft 231 and all that remains to be done in order to render conveyer 253 ready for operation is to separate endless conveyer element 277 (if this has not already been done) and reconnect same around upper roll element 281. Next replace chain 58 around sprockets 56, 49 and 59, replace shield 90, replace chain 89 around sprockets 47, 48 and 57, remount stub shaft 79 and dual pulley 81 on bracket extension 78 and replace the belt around pulleys 69 and 81. When this has been done all parts of the base unit and all parts of the grass unit, with the exception of the cutter bar 254, are obviously rendered operative upon an application of power to transmission input shaft 82. And in order to render the cutter bar mechanism 254 operative, wobble box 136 is removed from the row crop unit and mounted on support 261 of the grass unit, which mounting places depending oscillating arm 138 in position for ready connection with the adjacent end of cutter bar pitman 284 and positions a pulley 286 on the inner end of shaft 212 (substituted for step pulley 213) in alignment with the same portion of dual pulley 81 as was previously used in driving wobble box shaft 212 when this box was mounted on the row crop unit and the latter attached to the base unit.

A forward side of wobble box 136 mounts a transverse bracket 287 which in turn supports a pair of upwardly converging members 288 and 289 for fore and aft swinging movement about a transverse horizontal axis, the upper ends of these members being fixedly joined and support a pulley 291. Member 288 mounts an elongated intermediate sleeve element 292 slidable longitudinally thereof and provided with forward and rearward facing projections 293 and 294 adjacent the lower and upper ends thereof, respectively. Projection 293 mounts a pulley 296 in line with pulley 291 and projection 294 has one end of a rope or cable 297 attached thereto which passes upward therefrom and over pulley 291 and then down and around pulley 296, it being understood that the forward end of rope 297 is secured to a support (not shown) preferably positioned to be within easy reach of the operator's station on a propelling vehicle (not shown). Sleeve 292 fixedly mounts a transversely disposed sleeve 298 which in turn rotatably supports a transversely extending shaft 299 having a pulley 301 fixed on the outer or near end thereof for rotation therewith and having a reel 302 fixedly carried by the inner or far side portion thereof, the reel being thereby disposed in operative overlying relation with respect to cutting mechanism 254. Referring also to Figs. 1 and 2, it will be seen that the hub portion of near side ground engaging wheel 8 mounts a sprocket 303 and that opposed rear portions of frame members 4 and 6 support a pair of laterally aligned vertically extending standards 304, which in turn support bearings 306 mounting a cross shaft 307 generally parallel to frame member 3 and to power input cross shaft 67. A sprocket wheel 308 is positioned on the near end of shaft 307 in alignment with wheel hub sprocket 303 and an intermediate portion of this shaft mounts a laterally fixed pivot support 309 which in turn mounts the rear end of a forwardly extending laterally rigid member comprising rear and front telescoping sections 311 and 312, respectively, a separation of which is resisted by a stiff tension spring 313 having its opposite ends fixed to collars 314 and 316 which are in turn fixed to adjacent portions of sections 311 and 312, respectively. The forward end of section 312 is pivotally attached to the transverse sleeve 298 carried by member 292 and is operative to maintain members 288 and 289 and sleeve 298 in a predetermined position and yet permit the height of reel 302 to be readily adjusted through means of rope 297. A rear portion of section 311 carries a fixed part 317 which in turn rotatably supports a cross stub shaft 318 disposed in overlying relation to section 311, stub shaft 318 being disposed in forwardly spaced parallel relation to cross shaft 307 and mounts a sprocket wheel 319 on its inner end aligned with a sprocket wheel 321 on the adjacent end of shaft 307. The near end of stub shaft 318 mounts a pulley 322 disposed in alignment with the pulley 301 on the outer end of reel shaft 299. And it should now be obvious that upon placing a chain 324 around sprockets 303 and 308, a chain 326 around sprockets 319 and 321, and a belt 327 around pulleys 301 and 322, the reel will be driven at a speed of rotation proportional to the rate of travel.

When the grass unit has been attached to the base unit and the connection of parts completed, as just described, it should be obvious that upon coupling tongue 11 to a propelling tractor and that upon connecting power transmitting shaft 82 to the tractor power take-off (not shown), the chopping, feeding, conveying and cutting devices may be operated as desired simply by controlling the input of power to shaft 82, the grass unit including the reel may be raised and lowered as desired simply by manipulating hand crank assembly 114, and the reel may be raised and lowered relative to the cutter bar and conveyer by adjusting rope 297 to vary the vertical position of sleeve 292 on member 288. As the harvester is propelled through a field the sickle element of the cutter bar mechanism severs the grass or legumes which through coaction of the rotating reel fall onto endless conveyer 253 and are carried thereby upward and rearward to feed rolls 34, 36 and 37 which operate to convey the material therethrough and into the chopping device in a layer conforming generally to the width of swath cut by the mowing mechanism.

In other words, the effective width of the conveyer and the effective width of the severed material passage afforded by the feed rolls are substantially coextensive with each other and with the effective length of the chopping device. In addition, it will be noted that the grass severing or mowing device is laterally symmetrically arranged relative to the conveying device and that the effective width of the latter is nearly equal to the effective length of the former. Consequently, severed material is conveyed and delivered to the chopping device with a minimum of compressing or compacting action both laterally and vertically with respect to its direction of travel. And it should be obvious that this type of construction overcomes several of the difficulties encountered in handling a swath of normal size with the prior art structures since the swath must be bunched and compressed in order to enter the small feed roll opening afforded by such structures. The bunching and compressing of severed material requires an excess of power, both for feeding and cutting, and frequently results in the narrow throat passage afforded by the prior art structures becoming plugged and/or the material being fed to the chopping device in large slugs. In accordance with applicant's invention, the power requirement is moderate and more uniform as the grass cut by the sickle is conveyed to the feed rolls in a wide relatively thin layer that is easily handled by the chopping device.

Applicant's row crop attachment can be readily substituted for the grass attachment, and when this is done it should be noted that a great deal of the apparatus for driving the reel can be left on the base unit. For example, it is only necessary to remove chain 326 and unfasten member 311 at pivot support 309 and the remaining reel drive apparatus can be left on the base unit as it will not interfere with the operation of the corn attachment. As previously disclosed, the stalk conveyers operate at different speeds so that the butt end of each stalk is conveyed to the far end of the feed rolls at a more rapid rate than the top portion thereof and when the butt end of the stalk is released by the conveyers and is about to enter the far side of the feed rolls, the action of the star wheel 160 causes each stalk to pivot laterally with the stalk coming to rest with its butt end grasped between the far ends of feed rolls 36 and 38 and with its upper end resting on the near side of chute 148 out of the way of oncoming stalks. In this connection, it will be noted that the stalks as they are fed between the feed rolls are positioned diagonally to the longitudinal center line of the base unit with the forward end of the stalks laterally offset to the far side of the base unit in relation to the rear end of the stalk. And as seen in Fig. 11 the blades 35 of chopping device 33 are diagonally mounted on the rotor with the far end of each blade 35 in leading relation to the near end of each blade. Therefore as the stalks are fed into the chopping device the stalks are being fed substantially perpendicularly to the blades 35 of chopping device 33. This results in greater cutting efficiency as it reduces the tendency of the stalks to move away from the cutting blades.

With the row crop attachment applicant has invented a substitute for the grass attachment which will handle a row crop with all the efficiency of grass handling by the combined grass unit. For example, the means for handling the stalks not only solves the problem of eliminating interference between stalks as they are fed into the chopping device but it also results in the full length of the chopping device being utilized instead of only a relatively small portion thereof, comparable to the thickness of several stalks. And consequently, the chopping knives stay sharp much longer than is the case where only a small portion of a knife or knives are active. In addition, if even a small portion becomes dull such dulling obviously necessitates a sharpening of the entire length of the chopping device and not just the active portion thereof.

Moreover, applicant's embodiment provides convenient means for jointly and severally varying the speed of three functions, namely, severing, feeding, and chopping, as desired, to meet operating conditions, as affecting the harvesting of both grass and row type crops. For instance, if it is desired to increase the sickle speed, a smaller pulley can be substituted for the power input pulley on the wobble box; if it is desired to increase the speed of the chopping device, a smaller pulley can be substituted for pulley 46 which drives the chopping device; and if it is desired to increase the speed of the feed rolls a smaller pulley can be substituted for the power input pulley of the feed rolls. In operation, the rotary chopping device has considerable flywheel action and it is therefore desirable to provide an overrunning clutch of conventional design between pulley 46 and chopping device 33 (not show) so that if the power being supplied by pulley 46 is stopped for any reason the chopping device can continue to revolve independently of pulley 46 and connected apparatus and therefore clear itself of chopped material. And as a further safeguard, it is also desirable to incorporate a conventional overload clutch of the type requiring manual reset between pulley 76 and feed roll drive sprocket 77 (not shown), as the inclusion of such a device serves to prevent stones or other objects of a size and nature likely to damage the chopping device 33 from passing between the feed rolls and into the former.

Furthermore, it should be apparent that the base unit can be utilized as a stationary chopping unit since material to be chopped may be fed between the feed rolls 36 and 38 in any suitable manner. Such chopping could be done in the farm yard to provide food for cattle or the like as it has been found that cattle will eat chopped material completely, whereas the cattle will do selective feeding, that is, eating only the choice parts and ignoring the balance of the feed, if the feed material is in an unchopped condition.

It should now be obvious that apparatus constructed in accordance with this invention accomplishes all the objects hereinbefore specified and affords all the advantages recited for such invention. And it should be understood that it is not intended to limit the invention either to its use for cutting forage and row crops and chopping same in particular or to the particular elements herein shown and described for purposes of illustration as various modifications within the scope of the appended claims may occur to persons skilled in the art.

It is claimed and desired to secure by Letters Patent:

1. In a mobile forage harvester having a wheeled frame, a row crop cutting device carried at a forward portion of said frame, a transversely extending rotary chopping cylinder positioned in said harvester above and to the rear of said cutting device, transversely extending stalk feeding rolls positioned in radially opposed relation to each other adjacent to and in front of said chopping cylinder and being substantially coextensive in length with said cylinder, said feeding rolls being adapted to feed stalks in a longitudinal direction opposite to the direction of travel of said harvester, a pair of gathering elements fixedly mounted on said frame and having side walls, respectively, at a predetermined transverse spacing from each other so as to form a narrow passage therebetween extending upwardly and rearwardly from said cutting device and terminating in proximity to said feeding rolls at a point forwardly opposite to one end of said chopping cylinder, a generally longitudinally extending stalk supporting chute member carried by said frame and having a rearward end portion extending in proximity to said feeding rolls from said upper end of said narrow passage to a point forwardly opposite to the other end of said chopping cylinder, and a cut stalk conveying mechanism carried by said frame and having an active portion operative in said narrow passage for presenting the butt ends of cut stalks to portions of said feeding rolls forwardly opposite to said one end of said chopping cylinder and for depositing upper portions of said presented stalks onto said chute member.

2. In a mobile forage harvester as recited in claim 1 wherein said cut stalk conveying mechanism comprises at least two vertically spaced endless conveyers operatively mounted in the side walls of one of said gathering elements and presenting active courses passing through said narrow passage, and power transmitting means operative to drive the upper of said conveyers at a slower speed than the lower conveyer.

3. In a mobile forage harvester having a wheeled frame, a row crop cutting device carried at a forward portion of said frame, a transversely extending rotary chopping cylinder positioned in said harvester above and to the rear of said cutting device, a transversely extending stalk feeding mechanism positioned adjacent to and in front of said chopping cylinder and being substantially coextensive in length with said cylinder, said feeding mechanism being adapted to feed stalks in a direction opposite to the direction of travel of said harvester, a pair of gathering elements fixedly mounted on said frame and having side walls, respectively, at a predetermined transverse spacing from each other so as to form a narrow passage therebetween extending upwardly and rearwardly from said cutting device and terminating in proximity to said feeding mechanism at a point forwardly opposite to one end of said chopping cylinder, a generally longitudinally extending stalk supporting chute member carried by said frame and having a rearward portion extending in proximity to said feeding mechanism from said upper end of said narrow passage to a point forwardly opposite to the other end of said chopping cylinder, at least two vertically spaced conveyers carried by said frame and presenting active courses passing through said narrow passage, power transmitting means operative to drive the upper of said conveyers at a slower speed than the lower conveyer so that cut stalks being moved in said narrow passage toward said feed mechanism by said conveyers have their butt ends presented to said feed mechanism while the upper ends of said stalks are tilted forward therefrom, and a stalk impelling member operatively mounted at the rearward upper end of said upper conveyer and positioned in said narrow passage in overlying relation to said chute at a height to contact midportions of conveyed stalks and to impel same out of said narrow passage and onto said chute.

4. In a mobile forage harvester having a wheeled frame, a row crop cutting device carried at a forward portion of said frame, an elongated chopping cylinder positioned in said harvester for rotation about a horizontal transversely extending axis above and to the rear of said cutting device, a pair of feeding rolls positioned adjacent to and in front of said chopping cylinder for rotation about horizontal axes extending generally parallel to the axis of said chopping cylinder, said feeding rolls being adapted to feed stalks therebetween in a direction opposite to the direction of travel of said harvester, a pair of gathering elements fixedly mounted on said frame and having side walls, respectively, at a predetermined transverse spacing from each other so as to form a narrow passage therebetween extending upwardly and rearwardly from said cutting device and terminating in proximity to said feeding rolls at a point forwardly opposite to one end of said chopping cylinder, a member joining said gathering elements to provide a floor in said narrow passage, a generally longitudinally extending stalk supporting chute member carried by one of said gathering elements and having a floor with the rearward edge thereof positioned adjacent to and forwardly of said feeding rolls, said rearward edge extending from the upper end of said narrow passage floor to a point forwardly opposite to the other end of said chopping cylinder, said chute being provided with a side wall member curving up and around said chute floor to a position joining said other gathering element and providing a laterally offset trough communicating with the upper end of said narrow passage and overlying said chute floor, at least two conveyers carried by said one gathering element and presenting active courses passing through said narrow passage, a rearwardly extending element adjustably carried by the other gathering element and positioned in said narrow passage and biased toward said conveyers so that severed stalks are maintained in contact with said conveyers while passing through said narrow passage, power transmitting means operative to drive the upper of said conveyers at a slower speed than the lower conveyer so that severed stalks being moved toward said feeding rolls by said conveyers have their butt ends presented to said feeding rolls while the upper ends of said stalks are tilted forward therefrom, and a power operated star wheel mounted at the rearward upper end of said upper conveyer and positioned in said narrow passage and in said communicating trough of said chute and at a height to contact midportions of said conveyed stalks, said star wheel being connected in driven relation with said upper conveyer for rotation in a direction to pivot conveyed stalks about their butt ends and to move the upper portions of such stalks out of said narrow passage through said communicating trough onto the floor of said chute with the tassel portions of such stalks longitudinally aligned to be fed to the other end of said chopping cylinder by said feeding rolls.

PAUL A. WHISLER.

References Cited in the file of this patent

UNITED STATES PATENTS

| Number | Name | Date |
|---|---|---|
| 1,462,765 | Miller | July 24, 1923 |
| 1,528,635 | Ronning et al. | Mar. 3, 1925 |
| 2,253,794 | Lindholm | Aug. 26, 1941 |
| 2,269,828 | Michel et al. | Jan. 13, 1942 |
| 2,439,259 | McCormack | Apr. 6, 1948 |
| 2,442,520 | Van Sickle | June 1, 1948 |